United States Patent Office.

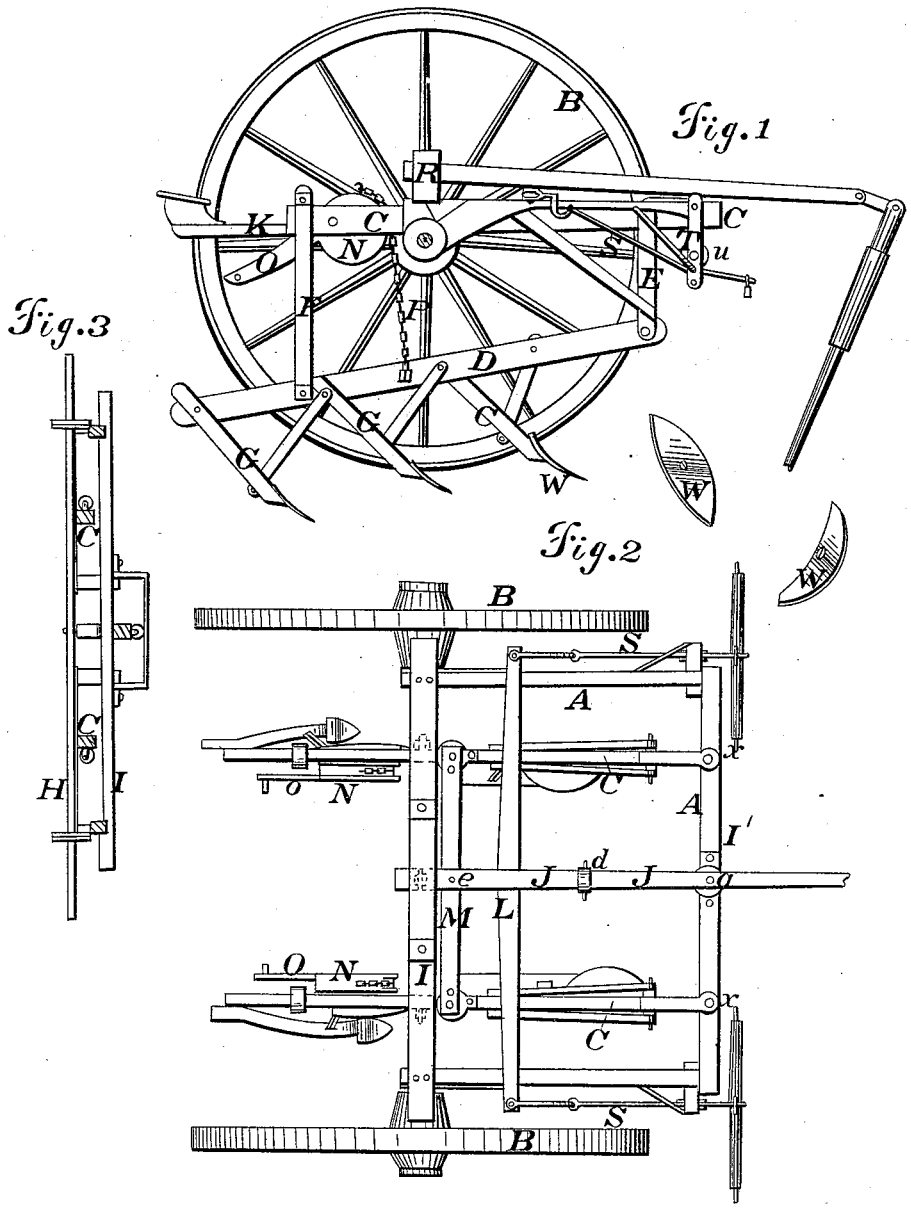

N. A. RAND, OF WINSLOW, ILLINOIS.

Letters Patent No. 79,598, dated July 7, 1868.

---

IMPROVEMENT IN CULTIVATORS.

---

The Schedule referred to in these Letters Patent and making part of the same.

---

TO ALL WHOM IT MAY CONCERN:

Be it known that I, N. A. RAND, of Winslow, in the county of Stephenson, and in the State of Illinois, have invented certain new and useful Improvements in Cultivators; and do hereby declare that the following is a full, clear, and exact description thereof, reference being had to the accompanying drawings, and to the letters of reference marked thereon.

In the annexed drawings, making part of this specification, A represents a frame, which is secured upon an axle, H, of a two-wheeled cultivator. B B represent the wheels which support the axle and frame. I represents the rear cross-bar of the frame A, and which lies immediately over and a little above the axle H. C C represent two stay-bars, which are pivoted at their forward ends to the front cross-bar, I', of the frame A, and which, passing back toward the rear of the machine, lie between the axle H and the rear cross-bar I. Depending from the stays C C, near their forward ends, are two supports, E E. D D represent the cultivator-beams. The forward ends of these beams are pivoted between the depending supports E E, in such a manner that they can be adjusted vertically between them, when desirable. The rear ends of the beams are provided upon each side with the guide-bars F, which stand vertically or project upwards, and embrace between them the rear ends of the stay-bars C C, so that the beams and stay-bars are always kept in line.

The shanks G G are secured at their upper ends to the beams D D, and are provided upon their lower ends with suitable cultivator-teeth. To the sides of the stay-bars C C, and near their rear ends, are pivoted the cam-wheels N, which are provided with the arms or levers O O, by means of which they are partially revolved. P P represent chains or cords, which are attached at one end to the peripheries of wheels N, and at their others to the beams D D. By means of the wheels N and their arms O and the chains P P, the beams are raised or lowered.

M represents a cross-bar, which is pivoted at each end to one of the stay-bars C C, and which keeps them at a given distance apart.

J represents the tongue of the machine, which is pivoted at $a$ to the forward cross-piece I' of the frame A. The rear end of this tongue is provided with a friction-roller upon its upper side, and said end plays between the cross-piece I and a loop, R, which is secured upon said piece. A pin may be passed through the tongue at $e$, and then down through cross-bar M, for the purpose of connecting the tongue and beams together, and so that they will move laterally simultaneously, or the pin may be passed down through the loop R, through the tongue, and into the cross-piece I, and thus the tongue made rigid with the frame A, in which case the beams act independently of it.

K represents a bar, upon the rear end of which the driver's seat is secured. This bar is pivoted, near its centre, in a central position upon the axle H, and between said axle and the cross-piece I, and at its forward end at $d$, between two supports, which depend from the tongue J. The forward end of this bar K can be adjusted by means of a movable pivot between the supports, so that the seat can be raised or lowered, at pleasure. The bar K is rigid when the tongue is made so, but when the tongue is connected to the beams, so that it will move laterally with them, the bar K moves laterally with them also, that is, its ends move laterally, its centre being pivoted.

The double-tree, L, is pivoted to one end of a metallic strap, the other end of said strap being connected to the axle by means of the bolt or pivot which passes through the bar K. Chains or traces, $s$, pass from the ends of the double-tree, forward of the frame A, and there are secured to the whiffle-trees. These chains pass between supports on the under side of the forward cross-piece of the frame, and under rollers or pulleys which are secured between said supports.

These pulleys may be raised or lowered between the supports, for regulating the draught of the machine.

It will be observed that the teeth W upon the forward shank G are peculiarly shaped. They are concave on their faces, and concave on one edge, and convex upon their other edge, and pointed at each end, so they may be reversed, if desirable. The shanks to which these teeth are attached may be shifted from one beam to the opposite, when it is desirable to change the direction in which the earth is thrown, either to or from the corn, in cultivating.

Having thus fully described my invention, what I claim as new, and desire to secure by Letters Patent, is—

The arrangement of the pivoted bars C C (that connect with the cultivator-beams D D) and the movable seat-bar K, between the axle and the frame-piece I, whereby the operator can shift the shovels by the action of his feet, the several parts being constructed to operate substantially as set forth.

In testimony that I claim the foregoing, I have hereunto set my hand, this 24th day of February, 1868.

N. A. RAND.

Witnesses:
    JOHN H. BUCHANAN,
    THOMAS B. HOWE.